United States Patent
Schindler et al.

(10) Patent No.: US 11,097,585 B2
(45) Date of Patent: *Aug. 24, 2021

(54) TORSION SPRING ARRANGEMENT FOR A WHEEL SUSPENSION ARRANGEMENT OF A MOTOR VEHICLE, AND WHEEL SUSPENSION ARRANGEMENT FOR A WHEEL OF AN AXLE OF A MOTOR VEHICLE

(71) Applicant: AUDI AG, Ingolstadt (DE)

(72) Inventors: Sebastian Schindler, Ingolstadt (DE); Mike Engel, Schlettau (DE)

(73) Assignee: AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/768,253

(22) PCT Filed: Nov. 6, 2018

(86) PCT No.: PCT/EP2018/080362
§ 371 (c)(1),
(2) Date: May 29, 2020

(87) PCT Pub. No.: WO2019/105691
PCT Pub. Date: Jun. 6, 2019

(65) Prior Publication Data
US 2020/0369106 A1 Nov. 26, 2020

(30) Foreign Application Priority Data
Nov. 30, 2017 (DE) .................. 10 2017 221 588.7

(51) Int. Cl.
*B60G 11/44* (2006.01)
*B60G 17/033* (2006.01)
(Continued)

(52) U.S. Cl.
CPC .............. *B60G 11/44* (2013.01); *B60G 11/32* (2013.01); *B60G 17/023* (2013.01);
(Continued)

(58) Field of Classification Search
CPC .............. B60G 11/44; B60G 2202/114; B60G 2202/1362; B60G 2204/121;
(Continued)

(56) References Cited

U.S. PATENT DOCUMENTS 10,246,149 B2 * 4/2019 Schindler ........... B62D 55/1083
2020/0298648 A1 * 9/2020 Schindler ............. B60G 17/023

FOREIGN PATENT DOCUMENTS

DE  102007012203 A1  9/2008
DE  102008028352 A1  12/2009
(Continued)

OTHER PUBLICATIONS

International Preliminary Report on Patentability (Chapter I) dated Jun. 11, 2020, in corresponding application No. PCT/EP2018/080362, 8 pages.
(Continued)

*Primary Examiner* — Ruth Ilan
*Assistant Examiner* — Matthew D Lee
(74) *Attorney, Agent, or Firm* — Maier & Maier, PLLC

(57) ABSTRACT

A torsion spring arrangement for a wheel suspension of a motor vehicle, including two torsion bars arranged coaxially one inside another and also a spring element, which is arranged axially-parallel to the two coaxial torsion bars and can be mounted on the motor vehicle body via a bearing position, wherein the radial outer hollow-cylindrical torsion bar can be mounted on the motor vehicle body side and is connected in a rotationally-fixed manner to an output lever fastenable on a wheel guiding element and the radial inner torsion bar is connected in a rotationally-fixed manner to the
(Continued)

outer torsion bar and is connected in a rotationally-fixed manner via a coupling to the spring element.

13 Claims, 5 Drawing Sheets

(51) Int. Cl.
   *B60G 21/055* (2006.01)
   *B60G 11/32* (2006.01)
   *B60G 17/02* (2006.01)

(52) U.S. Cl.
   CPC ......... *B60G 17/025* (2013.01); *B60G 17/033* (2013.01); *B60G 21/0551* (2013.01); *B60G 21/0553* (2013.01); *B60G 2202/114* (2013.01); *B60G 2202/135* (2013.01); *B60G 2204/121* (2013.01); *B60G 2204/122* (2013.01); *B60G 2204/418* (2013.01); *B60G 2204/82* (2013.01); *B60G 2204/8302* (2013.01); *B60G 2206/012* (2013.01); *B60G 2206/427* (2013.01); *B60G 2206/7101* (2013.01)

(58) Field of Classification Search
   CPC ........ B60G 2204/122; B60G 2206/012; B60G 2206/427; B60G 17/023; B60G 2202/134
   See application file for complete search history.

(56) References Cited

FOREIGN PATENT DOCUMENTS

| DE | 102010033002 A1 | | 2/2012 | |
|----|---|---|---|---|
| DE | 102016217698 A1 | | 3/2018 | |
| DE | 102017221588 A1 | * | 6/2019 | ............ B60G 11/20 |
| EP | 0197850 A1 | | 10/1986 | |
| EP | 1783023 A1 | * | 5/2007 | ............ B62K 21/00 |
| EP | 2522533 A1 | * | 11/2012 | ............ B60G 11/10 |
| WO | WO-2019105691 A1 | * | 6/2019 | ........... B60G 17/025 |

OTHER PUBLICATIONS

International Search Report and Written Opinion dated Feb. 13, 2019 in corresponding application No. PCT/EP2018/080362; 20 pages.

* cited by examiner

TORSION SPRING ARRANGEMENT FOR A WHEEL SUSPENSION ARRANGEMENT OF A MOTOR VEHICLE, AND WHEEL SUSPENSION ARRANGEMENT FOR A WHEEL OF AN AXLE OF A MOTOR VEHICLE

FIELD

The disclosure relates to a torsion spring arrangement for a wheel suspension of a motor vehicle and a wheel suspension for a wheel of an axle of a motor vehicle.

BACKGROUND

A generic torsion spring arrangement having two torsion bars arranged coaxially one inside another and also a spring element arranged in parallel to the two torsion bars, i.e., in the axial direction (a) of the torsion bars, which is operationally connected to the torsion bars and thus acts in series to the torsion bars with respect to the spring action, is disclosed in subsequently published DE 10 2016 217 698. The disclosed torsion spring arrangement is distinguished in that a first actuator for displacing a spring base point and/or a second actuator for setting a torsion spring constant is associated with the spring element. According to the disclosure of DE 10 2016 217 698, a rotational movement is essentially applied to the spring element, i.e., the spring element is essentially loaded with torsion.

SUMMARY

The disclosure is based on the object of refining a torsion spring arrangement for a wheel suspension of a motor vehicle in such a way that a construction reduced in cost and complexity is enabled.

In a known manner, the torsion spring arrangement for a wheel suspension of a motor vehicle comprises two torsion bars arranged coaxially one inside another and also an additional spring element, which is aligned in the axial direction a of the torsion bars and is arranged axially-parallel with radial distance to the two coaxial torsion bars, and which is mountable via a bearing position on the motor vehicle body. The radially outer, hollow-cylindrical torsion bar, which is fixedly mountable via a bearing on the motor vehicle body, is connected here in a rotationally-fixed manner to an output lever fastenable on a wheel guiding element, and the radially inner torsion bar is connected in regions in a rotationally-fixed manner to the outer torsion bar and is connected in a rotationally-fixed manner via a coupling to the spring element, so that the spring element acts in series with the torsion bars with respect to the spring action.

According to the invention, it is proposed that the spring element be mounted via a spring element bearing on the coupling, which is designed in such a way that exclusively a translational deflection oriented in the tangential direction, i.e., perpendicular to the radial direction r and perpendicular to the axial direction a, is applied to the spring element, and that the bearing position mounting the spring element on the motor vehicle body side be formed as a plain bearing displaceable with respect to the spring element in the axial direction.

The spring element bearing arranged between spring element and coupling, which converts a rotational movement of the coupling resulting from a twist of the inner torsion bar into a tangentially oriented translational movement engaging on the spring element, has the effect that the spring element is exclusively stressed by bending and not—as in the prior art according to DE 10 2016 217 698—substantially by torsion.

The design according to the invention has the advantage that due to the exclusively translational deflection of the spring element, the spring element can now be embodied solely as a bending spring, with the advantage that a simpler and thus complexity-reduced structure of the torsion spring arrangement and thus also a more cost-effective construction of the torsion spring arrangement is enabled.

Preferably, the spring element is designed in the form of a leaf spring. In addition to low costs, the design of the spring element as a leaf spring also has the further advantage that the fixed bearing mounting the leaf spring on the motor vehicle body side is to be implemented particularly easily and cost-effectively, for example, in the form of a clamping unit.

The leaf spring can be formed from a metallic material or a fiber-composite material.

In one preferred technical implementation, the spring element bearing comprises a deflectable, i.e., displaceable bearing element, which is translationally guided in the tangential direction via a guide mounted fixed on the motor vehicle side, a first bearing part connected to the coupling and to the bearing element, a second bearing part connected to the spring element and the bearing element, and means which convert the rotational coupling movement, i.e., a rotational movement of the coupling resulting from a pivot of the second torsion bar, into a translational movement of the bearing element and thus of the second bearing part.

According to a first embodiment of the spring element bearing, in this case the means for converting the rotational coupling movement into a translational movement are formed in the form of a pivotable mounting of the coupling on the bearing element. For this purpose, the coupling is preferably mounted pivotably on the first bearing part around a first pivot axis $S_1$, which is aligned in parallel to the torsion bars, and which is aligned perpendicularly in relation to the guide and thus viewed in relation to the translational displacement direction, and the first bearing part is pivotably mounted on the bearing element around a second pivot axis $S_2$ lying parallel to the first pivot axis $S_1$.

An alternative second embodiment of the coupling-side bearing provides that the means for converting the rotational coupling movement into a translational movement are formed in the form of a rubber-metal bearing arranged between the guide and the first and/or the second bearing part. This embodiment is advantageous in that due to the use of rubber-metal bearings, a cost-effective construction is ensured, and that moreover an acoustic decoupling is additionally ensured due to the rubber-metal bearing(s).

In this case, the spring element is preferably pivotably mounted on the second bearing part around a third pivot axis $S_3$ aligned perpendicular to the torsion bars and perpendicular to the guide. This has the advantage that a tension-free adjustment is ensured.

For the sake of completeness, it is also to be noted that the rotationally-fixed connection in regions of the inner torsion bar to the outer torsion bar is preferably formed at the end region of the inner torsion bar opposite to the coupling and, for example, in the form of a formfitting connection, in particular in the form of gear teeth, or in the form of a materially-bonded connection. In addition, it is also to be noted that the fixed mounting on the motor vehicle side of the outer torsion bar takes place both directly, i.e., the torsion bar and/or the spring element are mounted via a bearing directly on a vehicle body component, and also indirectly, i.e., the bearing mounting the torsion bar and/or the spring element is fastened on a further component, which is in turn mounted fixed on the vehicle body.

The invention is furthermore based on the object of refining a wheel suspension for a wheel of an axle of a motor vehicle according to the type specified in the preamble of claim 9 in such a way that a construction which saves costs and installation space is enabled.

This object is achieved by the characterizing features of claim 9 in conjunction with the features of its preamble.

Dependent claims 10 and 11 form advantageous refinements of the wheel spring arrangement according to the invention.

The wheel suspension according to the invention for a wheel of an axle of a motor vehicle is distinguished in that a suspension spring acting between the motor vehicle body and a wheel guiding element is designed in the form of a torsion spring arrangement as claimed in any one of claims 1 to 8. Due to the design of the suspension spring in the form of the torsion spring arrangement according to the invention, a construction which is compact viewed in the vehicle vertical direction and thus requires little installation space is advantageously enabled, which, due to the now enabled design of the spring element as a bending spring, is less complex and thus more cost-effective in comparison to the prior art according to DE 10 2016 217 698.

According to one particularly advantageous embodiment of the wheel suspension according to the invention, it furthermore comprises a stabilizer aligned in the vehicle transverse direction and designed in the form of a hollow-cylindrical torsion spring bar, wherein the torsion spring arrangement is arranged in regions coaxially in the interior of the hollow-cylindrical torsion spring bar. That is, the torsion spring bar of the stabilizer and the two torsion bars of the torsion spring arrangement are aligned in the vehicle transverse direction and have a shared axis of rotation R due to the coaxially nested arrangement. Due to the coaxially nested arrangement, an arrangement of the suspension spring which particularly saves installation space is advantageously enabled.

A further advantageous embodiment of the wheel suspension according to the invention provides that, in the region of the coaxial nesting of stabilizer and suspension spring, i.e., in the region of the coaxially nested arrangement of the components torsion spring bar and torsion spring arrangement, a housing fixedly mounted on the motor vehicle body side is provided, by which the components are enclosed in this region. Both the stabilizer bearing mounting the torsion spring bar of the stabilizer and also the bearing mounting the outer torsion bar of the torsion spring arrangement are mounted on the housing fixedly mounted on the motor vehicle body side. That is, the torsion spring bar and the outer torsion bar are in turn fixedly mounted indirectly on the vehicle body side via the housing fixedly mounted on the motor vehicle body side.

Further advantages and possible applications of the present invention result from the following description in conjunction with the exemplary embodiment illustrated in the drawing.

DETAILED DESCRIPTION

Figure 1:
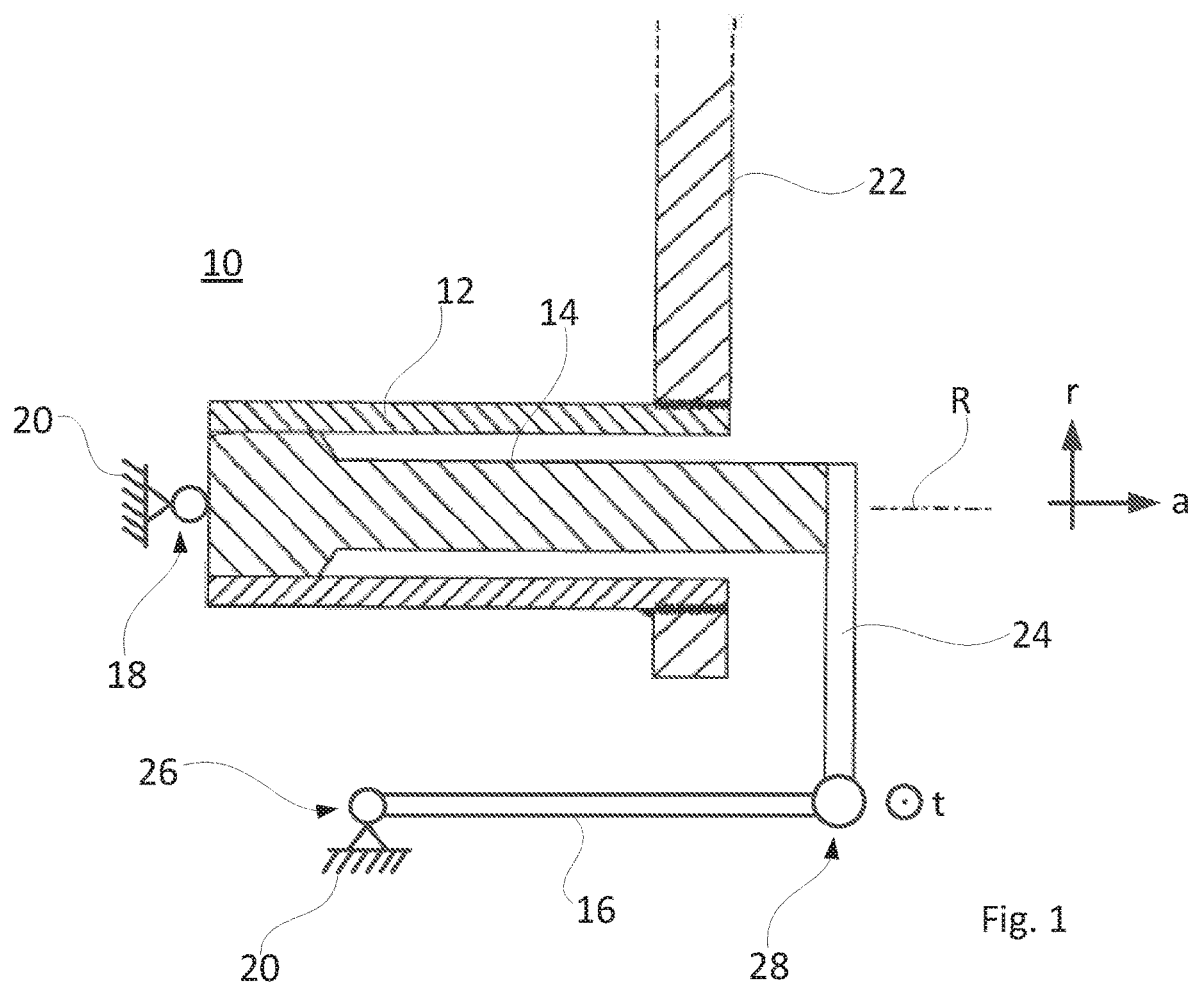
FIG. 1 shows a schematic sectional illustration of the torsion spring arrangement according to the invention.

FIG. 1 shows a schematic sectional illustration of a torsion spring arrangement, identified as a whole with the reference signs 10, for a wheel suspension of a motor vehicle.

The torsion spring arrangement 10 comprises an outer torsion bar 12 viewed in the radial direction r, an inner torsion bar 14 arranged coaxially inside the outer torsion bar 12, and a spring element 16, which is designed in the form of a leaf spring and is arranged axially-parallel having radial distance to the two torsion bars 12, 14. In this case, as shown in FIG. 1, the outer torsion bar 12 is fixedly mounted via a bearing 18 on the motor vehicle body 20 and is connected in a rotationally-fixed manner to an output lever 22 fastenable on a wheel guiding element.

The shared axis of the two torsion bars 12, 14, which is aligned in the axial direction a, is identified by R hereafter.

The spring element 16 is connected to the inner torsion bar 14 via a coupling 24 and is mounted at its end facing away from the coupling 24 via a bearing position 26 on the motor vehicle body 20 and via a spring element bearing 28 on the coupling 24. The inner torsion bar 14 is fixedly connected to the outer torsion bar 12 at its end region facing away from the coupling 24, so that the torsion bars 12, 14 and the spring element 16 form a series circuit with respect to the spring action, i.e., the spring element 16 acts in series in relation to the two torsion bars 12, 14 with respect to the spring action.

The spring element bearing 28 is designed here in such a way that a rotational movement of the coupling 24 resulting from a pivot of the inner torsion bar 14 around the axis R is converted into a translational movement engaging on the spring element 16 and oriented in the tangential direction. The translational deflection of the spring bar 16 extending perpendicularly to the figure sheet in FIG. 1 is identified by the reference sign t. Due to the solely translational deflection of the spring bar 16, it is thus ensured that the spring element 16 designed in the form of a leaf spring is exclusively stressed by bending.

Figure 2:
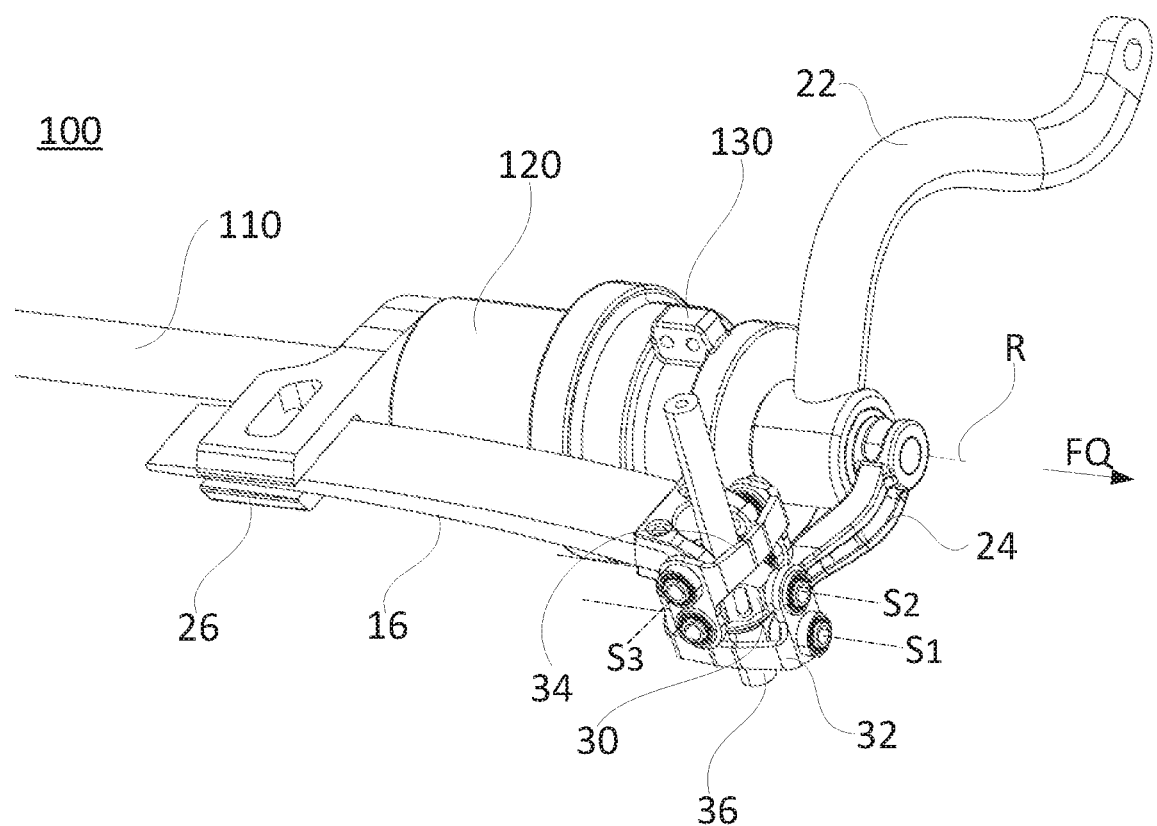
FIG. 2 shows a portion of a wheel suspension of a motor vehicle having a suspension spring designed as a torsion spring bar assembly according to FIG. 1.

FIG. 2 shows a portion of a wheel suspension identified as a whole by the reference sign 100, in which the suspension spring is formed by a torsion spring arrangement 10.

The wheel suspension 100 comprises a stabilizer aligned in the vehicle transverse direction FQ and designed in the form of a hollow-cylindrical torsion bar 110, which—like the outer torsion bar 12 of the torsion spring arrangement 10—is connected in a rotationally-fixed manner to the output lever 22. The output lever 22 is fastenable in a known manner with a wheel guiding element, for example, a suspension arm.

Figure 3:
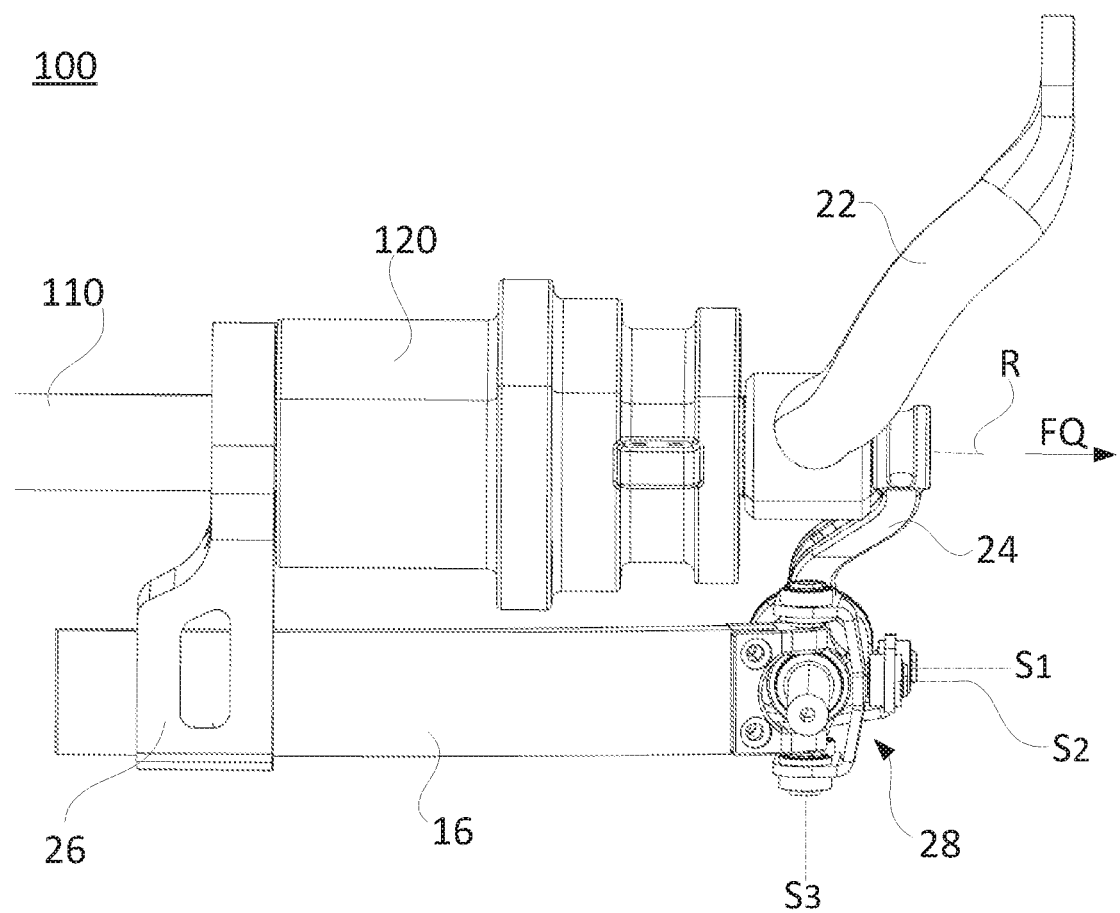
FIG. 3 shows a top view of the wheel suspension according to FIG. 2.
Figure 4:
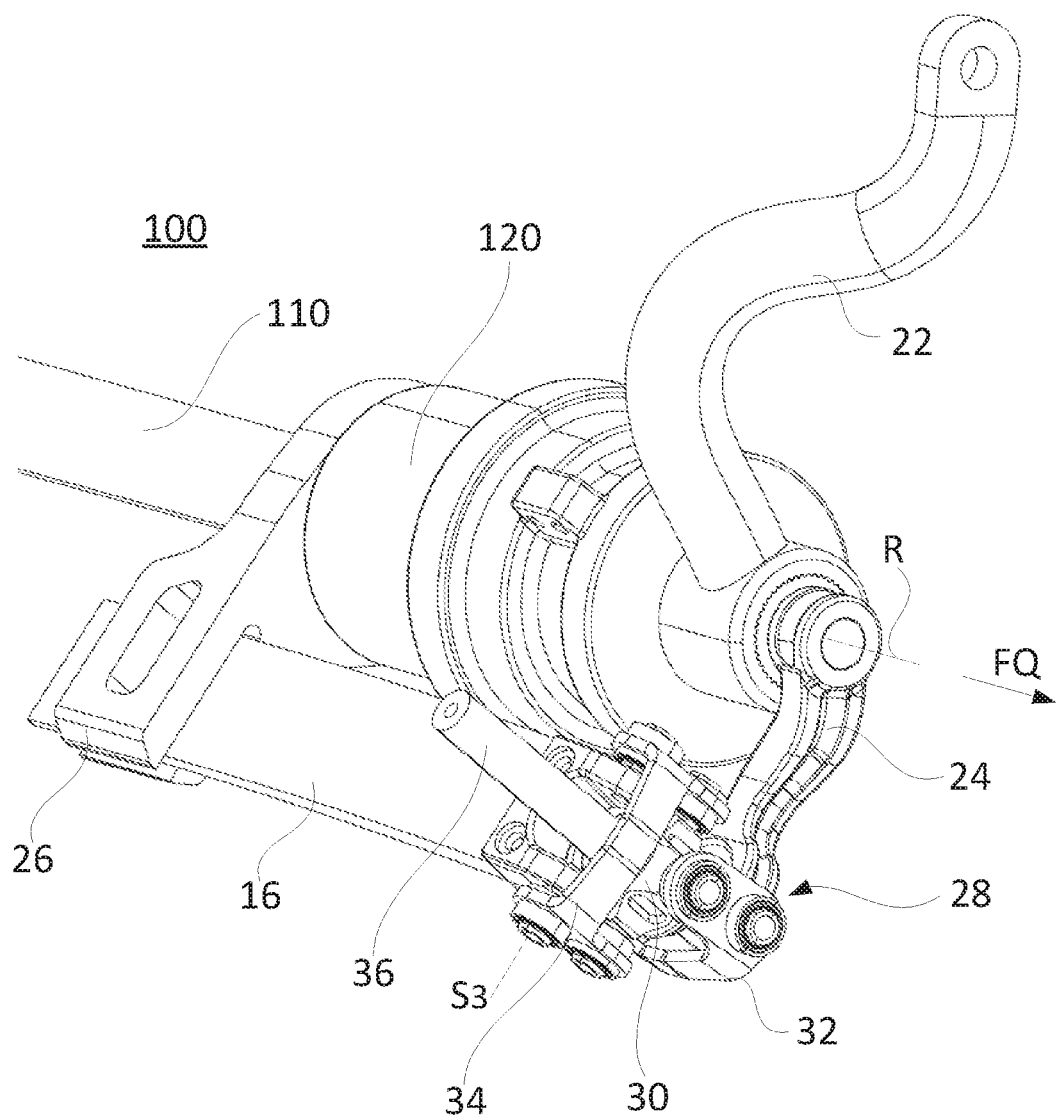
FIG. 4 shows a view diagonally from above of the wheel suspension according to FIG. 2.

As FIGS. 2 to 4 furthermore show, in this case the torsion bar 110 of the stabilizer is enclosed in regions by a housing 120. The housing 120 can be fixedly mounted via a bearing position 130 on the motor vehicle body. The torsion bar 110 is mounted on the vehicle body side via a stabilizer bearing arranged in the housing 120.

Of the torsion bar spring arrangement 10, in the present case only the coupling 24, the spring element bearing 28, the spring element 16 designed in the form of a leaf spring, and the fixed bearing 26 are visible; the two torsion bars 12, 14 of the torsion bar spring arrangement 10, which are arranged coaxially in the interior of the torsion bar 110 of the stabilizer, are concealed by the housing 120 in the present case.

As FIGS. 2 to 4 show, in this case the fixed bearing 26 is implemented in the form of a clamping unit and is mounted on the housing 120 and thus fixedly on the motor vehicle body. Moreover, the bearing 18—not visible here—mounting the outer torsion bar 12 is mounted via the housing 120 on the motor vehicle body.

Figure 5:
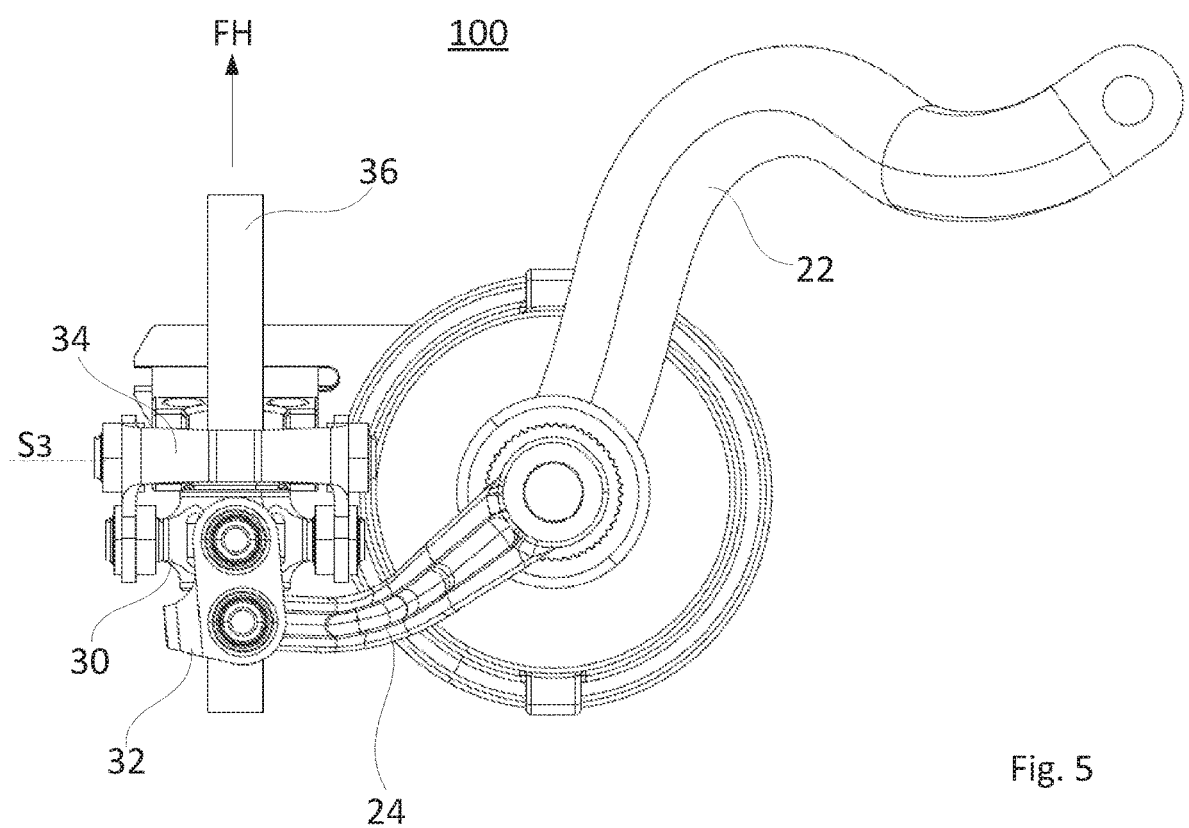
FIG. 5 shows a side view from below of the wheel suspension according to FIG. 2.

As is apparent in particular from FIG. 2 and FIG. 5, the spring element bearing 28 comprises three bearing components, namely a bearing element 30, a first bearing part 32 connected to the coupling 24 and the bearing element 30, and a second bearing part 34 connected to the spring element 16 and the bearing element 30, wherein the bearing element 30 is translationally guided in the motor vehicle vertical direction FH via a guide 36, which is fixedly mounted on the motor vehicle body side and is aligned in the motor vehicle vertical direction FH.

To convert the rotational movement of the coupling 24 oriented around the axis R into a tangential direction t, i.e., in the present case into a translational movement of the second bearing part 34 aligned in the vehicle vertical direction FH and thus of the end of the spring element 16 mounted in the bearing 28, the coupling 24 is mounted via a pivotable mounting on the bearing element 30. For this purpose, the coupling 24 is pivotably mounted on the first bearing part 32 around a first pivot axis $S_1$ arranged in parallel to the two torsion bars 12, 14 and thus in parallel to the axis R and the first bearing element 32 is pivotably arranged on the bearing element 30 around a second bearing axis $S_2$ aligned in parallel to the first bearing axis $S_1$.

To avoid tensions, the spring element 16 is moreover mounted on the second bearing element 34 around a third pivot axis $S_3$ aligned perpendicular to the two torsion bars 12, 14 and perpendicular to the tangential direction t, i.e., perpendicular to the vehicle vertical direction FQ.

The invention claimed is:

1. A torsion spring arrangement for a wheel suspension of a motor vehicle, comprising:
   two torsion bars arranged coaxially one inside another and also a spring element, which is arranged with radial distance to the two coaxial torsion bars, is aligned in the axial direction of the torsion bars and can be mounted on the motor vehicle body via a bearing position, wherein the outer hollow-cylindrical torsion bar viewed in the radial direction can be mounted on the motor vehicle body side and is connected in a rotationally-fixed manner to an output lever fastenable on a wheel guiding element and the inner torsion bar viewed in the radial direction is connected in a rotationally-fixed manner to the outer torsion bar and in a rotationally-fixed manner to the spring element via a coupling,
   wherein the spring element is mounted via a spring element bearing on the coupling, which is designed in such a way that exclusively a translational deflection oriented in the tangential direction is applied to the spring element, and in that the bearing position mounting the spring element on the motor vehicle body side is designed as a fixed bearing.

2. The torsion spring arrangement as claimed in claim 1, wherein the spring element is designed in the form of a leaf spring.

3. The torsion spring arrangement as claimed in claim 2, wherein the leaf spring is formed from a metallic material or a fiber-composite material.

4. The torsion spring arrangement as claimed in claim 1, wherein the spring element bearing comprises a deflectable bearing element translationally guided via a guide, a first bearing part connected to the coupling and to the bearing element, and a second bearing part connected to the spring element and the bearing element, and also means which convert the rotational coupling movement into a translational movement of the bearing element and thus of the second bearing part.

5. The torsion spring arrangement as claimed in claim 4, wherein the means for converting the rotational coupling movement into a translational movement are designed in the form of a pivotable mounting of the coupling on the bearing element.

6. The torsion spring arrangement as claimed in claim 5, wherein for the pivotable mounting of the coupling on the bearing element, the coupling is pivotably mounted on the first bearing part around a first pivot axis ($S_1$) aligned in parallel to the two torsion bars, and in that the first bearing part is pivotably arranged on the bearing element around a second pivot axis ($S_2$) lying in parallel to the first pivot axis ($S_1$).

7. The torsion spring arrangement as claimed in claim 4, wherein the means for converting the rotational coupling movement into a translational movement are formed in the form of a rubber-metal bearing arranged between the guide and the first and/or the second bearing part.

8. The torsion spring arrangement as claimed in claim 6, wherein the spring element is pivotably mounted on the second bearing part around a third pivot axis ($S_3$) aligned perpendicular to the torsion bars and perpendicular to the guide.

9. The torsion spring arrangement as claimed in claim 2, wherein the spring element bearing comprises a deflectable bearing element translationally guided via a guide, a first bearing part connected to the coupling and to the bearing element, and a second bearing part connected to the spring element and the bearing element, and also means which convert the rotational coupling movement into a translational movement of the bearing element and thus of the second bearing part.

10. The torsion spring arrangement as claimed in claim 3, wherein the spring element bearing comprises a deflectable bearing element translationally guided via a guide, a first bearing part connected to the coupling and to the bearing element, and a second bearing part connected to the spring element and the bearing element, and also means which convert the rotational coupling movement into a translational movement of the bearing element and thus of the second bearing part.

11. A wheel suspension for a wheel of an axle of a motor vehicle, comprising a suspension spring acting between the motor vehicle body and a wheel guiding element, wherein the suspension spring is designed in the form of a torsion spring arrangement comprising:
   two torsion bars arranged coaxially one inside another and also a spring element, which is arranged with radial distance to the two coaxial torsion bars, is aligned in the axial direction of the torsion bars and can be mounted on the motor vehicle body via a bearing position, wherein the outer hollow-cylindrical torsion bar viewed in the radial direction can be mounted on the motor vehicle body side and is connected in a rotationally-fixed manner to an output lever fastenable on a wheel guiding element and the inner torsion bar viewed in the radial direction is connected in a rotationally-fixed manner to the outer torsion bar and in a rotationally-fixed manner to the spring element via a coupling, wherein the spring element is mounted via a spring element bearing on the coupling, which is designed in such a way that exclusively a translational deflection oriented in the tangential direction is applied to the spring element, and in that the bearing position mounting the spring element on the motor vehicle body side is designed as a fixed bearing.

12. The wheel suspension as claimed in claim 11, wherein the wheel suspension furthermore comprises a stabilizer aligned in the vehicle transverse direction and designed in the form of a hollow-cylindrical torsion spring bar, wherein the torsion spring arrangement is partially arranged coaxially in the interior of the hollow-cylindrical torsion spring bar.

13. The wheel suspension as claimed in claim 12, wherein in the region of the coaxially nested arrangement of the components, torsion spring bar and torsion spring arrangement, the components, torsion spring bar and torsion spring arrangement are enclosed by a housing fixedly mounted on the vehicle body side, wherein the torsion spring bar of the stabilizer is mounted on the housing and thus on the motor vehicle body side and wherein the hollow-cylindrical torsion bar of the torsion spring arrangement is fixedly mounted on the housing and the fixed bearing associated with the spring element is fixedly mounted on the housing and thus on the motor vehicle body side.

* * * * *